INVENTOR.
James A. Bernard

March 26, 1963

J. A. BERNARD 3,082,933

ELECTROMAGNETIC CLUTCH

Filed Dec. 16, 1960

INVENTOR.
James A. Bernard
BY
Carl A. Stickel
HIS ATTORNEY

United States Patent Office 3,082,933
Patented Mar. 26, 1963

3,082,933
ELECTROMAGNETIC CLUTCH
James A. Bernard, Dayton, Ohio, assignor to General Motors Corporation, Detroit, Mich., a corporation of Delaware
Filed Dec. 16, 1960, Ser. No. 76,333
9 Claims. (Cl. 230—15)

This application is similar in its general features to but incorporates improvements in construction and materials over the embodiment illustrated in FIGURES 1 and 2 of my copending application S.N. 772,122, filed November 5, 1958.

This invention is related in a general way to refrigerating apparatus but more particularly to electromagnetic clutch drives such as may be used in a variety of driving applications, especially for the driving of compressors for automobile air conditioning systems.

In automotive air conditioning refrigerating systems, it has been found most economical to drive the refrigerant compressor through pulleys and belts from the engine which drives the car. Obviously, the engine must operate primarily at such times and at such speeds according to the desired operation of the car and the shifting of the transmission. Consequently, serious problems are encountered in the control of automobile air conditioning refrigeration systems.

It is desirable that the compressor be disconnected from the engine to relieve the engine from this load and to avoid useless operation of the compressor whenever refrigeration is not required. In the past, it has been found that clutches between the engine and the compressor could not withstand repeated clutching and declutching to cycle the compressor in accordance with temperature or refrigerating requirements so that it was necessary to provide a by-pass circuit in which a by-pass valve was cycled to regulate the amount of refrigeration applied to the air for the purpose of regulating the temperature within the car. The clutch then was operated only to manually start and stop refrigeration. Even with this limited duty, frequent difficulties were encountered since ball bearing failures occurred while the clutch was engaged during operation of the compressor. At this time, there was no relative rotation between the pulley and the shaft and, therefore, no relative rotation of the races and balls of the pulley bearing. During such periods, vibration caused the balls to fret the races of the ball bearing causing failures thereof.

Other difficulties encountered include the overheating of bearings, the glazing, galling and contamination of the friction surfaces and the warping of the armature.

It is an object of this invention to provide a clutch arrangement capable of repeated clutching and declutching without failure by manual control or as required by a temperature control responsive to the air in the car.

It is another object of this invention to provide a simple, relatively inexpensive, compact electromagnetic clutch arrangement in which a small electric current will control great clutching power.

It is another object of this invention to provide a self-energizing arrangement for the armature of an electromagnetic clutch.

It is another object of this invention to provide an improved mounting and structural arrangement for a multiple-ringed armature which minimizes warping of the armature.

It is another object of this invention to provide a simple improved arrangement for reducing the heating of the pricipal bearing of a magnetic clutch.

It is another object of this invention to provide a simple arrangement for keeping the friction surfaces of the electromagnetic clutch clean and free from glazing and galling.

It is another object of this invention to provide a magnetic clutch having such a structure and such arrangement that it may be easily assembled and disassembled.

These and other objects are attained in the form shown in the drawings in which the discharge head of the compressor or a rigid part of some other device to be driven is provided with an integral tubular extension supporting the ball bearing for the pulley. The driven shaft extends from within the housing out through the tubular extension and is connected by three splayed leaf springs to an axially movable multiple-ringed armature of paramagnetic material. An electromagnet coil is bonded within a coil housing of paramagnetic material. Both are locked rotationally by an interlocking arrangement to the housing and also locked axially upon the tubular extension by a locking ring.

The drive pulley includes an inner sleeve of paramagnetic material mounted upon the outer race of the ball bearing and having an extension extending within the coil close to the tubular extension so as to form an efficient magnetic bridge with the coil. This sleeve also extends in the opposite direction toward the magnetic clutch disk to form one pole face adjacent the disk. For providing a magnetic bridge, the pulley rim of paramagnetic material has extending in one direction an annular flange telescoping with the outer rim of the coil housing. The pulley rim also has a flange extending in the opposite direction to form a pole face adjacent the armature. The pulley also includes a portion of non-magnetic material composed of phenol formaldehyde resin containing asbestos fibers located between the pulley rim and the sleeve. The portion adjacent the pole faces contains an abrasive such as aluminum oxide and also contains an intermediate pole ring. The remaining resin contains non-magnetic metal chips, such as aluminum, for transmitting heat from the bearing to the pulley rim.

Further objects and advantages of the present invention will be apparent from the following description, reference being had to the accompanying drawings wherein preferred embodiments of the present invention are clearly shown.

Figure 1:
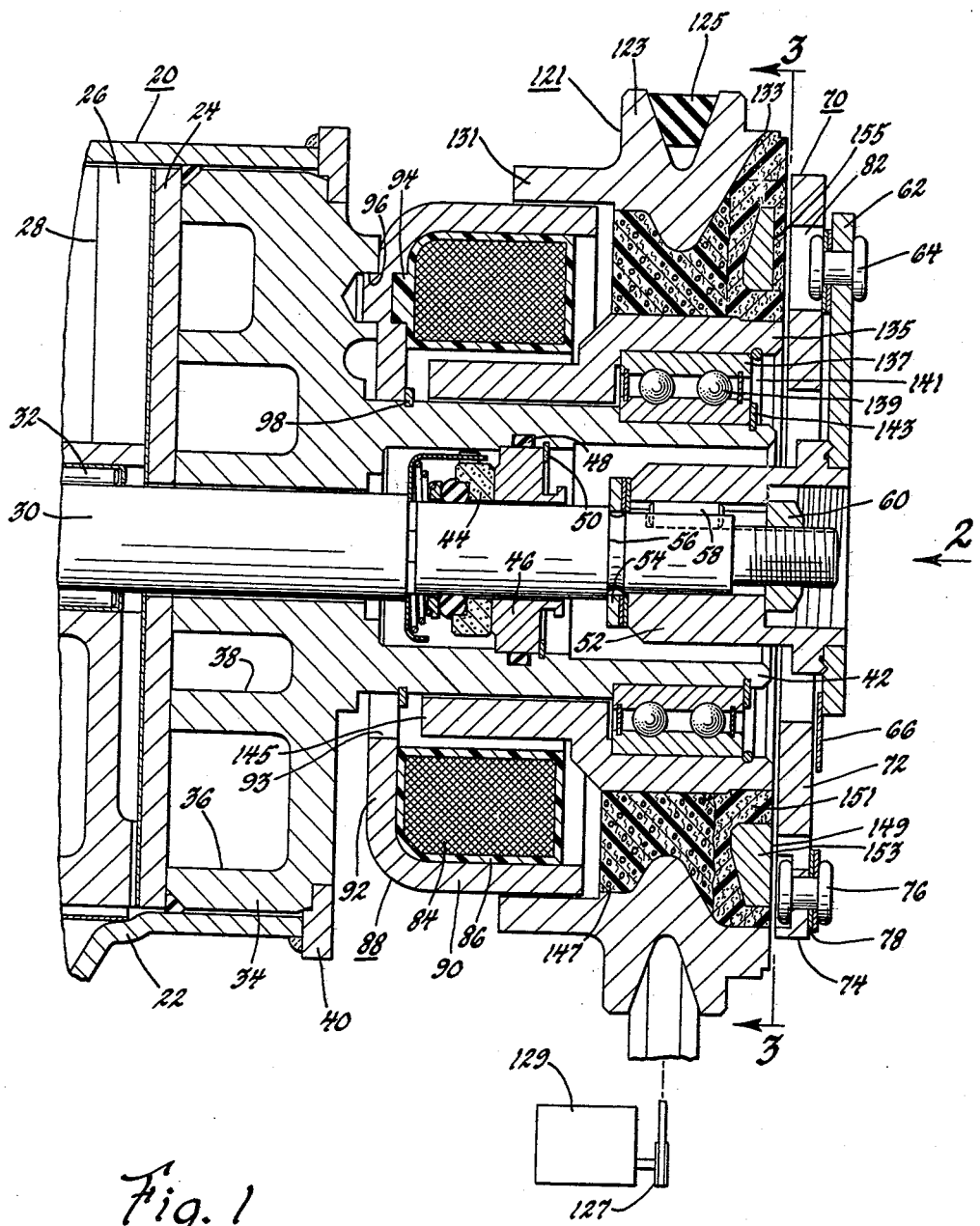
FIGURE 1 is a sectional view taken along the lines 1—1 of FIGURE 2 of an electromagnetic clutch embodying one form of my invention.

Referring now to the drawings and particularly to FIGURE 1, there is shown a device to be driven, such as a refrigerant compressor 20 provided with a housing 22 surrounding the valve plate 24 and a plurality of cylinders 26 containing pistons 28 which are operated by the driven shaft 30 rotatably mounted in the needle bearings 32. The housing 22 also includes the discharge chambers 36 as well as the inlet chambers 38. The housing 22 also includes a mounting ring 40.

The discharge head 34 is provided with an integral tubular extension 42. The driven shaft 30 extends outwardly through this tubular extension 42 and is provided with a rotating shaft seal 44. This rotating shaft seal 44 is pressed into sealing engagement with the stationary seal ring 46 sealed to the tubular extension 42 by a gasket seal ring 48 lodged in a groove in the extension 42. The seal ring 46 is lodged against an inner shoulder within the tubular extension 42 and is locked in place by a split locking ring 50 held within a groove in the tubular extension 42. The inner bore of the tubular extension 42 is enlarged for easy removal of the lock ring 50, the seal ring 46 and the rotating part 44 of the shaft seal.

The enlarged inner bore of the tubular extension provides room for the greater portion of the hub 52 which is mounted upon the reduced end portion of the shaft 30 with spacing rings 54 provided between the inner end of the hub 52 and the shoulder 56 on the shaft 30. The hub 52 is keyed to the shaft 30 by a cylindrical key 58 and held on the end of the shaft by a nut 60 which is threaded within an enlarged recess in the hub 52 onto a reduced end portion of the shaft 30. Beyond the end of the tubular extension 42, the hub 52 is provided with three arms 62. Riveted to the outer ends of each of these arms by the rivets 64 are three sets of splayed leaf springs extending in a V arrangement in a direction opposite the direction of rotation.

The three inner leaf springs 66 are connected at their other ends by rivets 68 to the inner ring 72 of the armature plate 70 of paramagnetic material such as low carbon steel. This armature plate 70 is divided into the inner ring 72 to which the rivets 68 fasten and an outer ring 74 to which the rivets 76 fasten to connect to the outer leaf springs 78. The magnetic separation of the inner ring 72 and the outer ring 74 is provided by three slots 80, each extending through an arc of about 110°, and three clearance apertures 82 provided in the armature plate 70 directly in line with the rivets 64 upon the hub 52. The purpose of the splayed arrangement of the leaf springs is to apply substantially equal pressure to the inner and outer ring portions to overcome any tendency of the plate 70 to warp under high temperature, high usage conditions. As shown, the springs 66 and 78 are flat and perfectly radial. The arrangement is such that, when the armature is attracted, the springs are bent toward the contacting frictional surfaces causing them to extend at a slight angle. When the armature plate 70 engages the frictional driving surface, the reaction upon the leaf springs 66 and 78, since they are in compression, causes a component of force which in a self-energizing action tends to augment the magnetic pull upon the armature against the frictional driving face to increase the contact pressure and, thus, to increase the driving torque.

For attracting the armature plate 70, there is provided an annular coil 84 of many turns surrounding the tubular extension 42. This coil 84 is embedded within and surrounded by a suitable resin 86, such as epoxy or nylon or polyester resin, which is cast within the coil housing 88 which includes a horizontal flange portion 90 extending toward the armature plate 70 and a radial portion 92 extending inwardly to the tubular extension 42. The coil housing 88 of paramagnetic material, such as steel or malleable iron, is provided with three locking recesses 94 into which the resin 86 is cast. In addition, the coil housing 88 is provided with three integral projections 96 which extend within three recesses in the discharge head 34 and form an interlocking connection preventing rotation of the coil housing 88 and the coil 84 around the tubular extension 42. The coil housing 88 is held axially against the discharge head 34 by a snap ring 98 engaging a groove in the outer periphery of the tubular extension and fitting against the adjacent face of the radially extending flange 92 of the coil housing 88. The flange 92 has its inner periphery scalloped or notched as indicated by the reference character 93 to minimize heat conduction with the tubular extension 42 and to provide a path for the circulation of air completely around the coil 84 and the coil housing 88 to cool these parts.

The drive pulley 121 has inner and outer rings of paramagnetic material, such as malleable iron. It has in its malleable iron outer rim 123 a V-belt pulley groove containing a V-belt 125 providing a driving connection with the pulley 127 upon the crank shaft of the automobile engine 129. The outer rim 123 of the pulley 121 is provided with a cylindrical flange 131 extending in telescoping arrangement with the flange 90 of the coil housing 88 to provide an efficient magnetic bridge therewith. The pulley rim 123 is also provided with a circular flange 133 extending in the opposite direction for providing a magnetic bridge with the outer ring 74 of the armature plate 70.

The pulley 121 has an inner sleeve 135 of paramagnetic material, such as malleable iron or steel, concentric with the tubular extension 42 and the shaft 30. It receives the outer race 137 of a double row ball bearing 139 which is locked in place against a shoulder within the sleeve by a locking ring 141 fitting within a groove in the inner sleeve 135. The inner race of the double-row ball bearing 139 is locked against a shoulder on the tubular extension 42 by a snap ring 143 which is lodged within a groove on the outer periphery of the tubular extension directly against the inner race of the bearing 139. The sleeve 135 is of substantially the same cross-sectional area throughout, in the axial direction, and has a cylindrical portion 145 extending between the coil 84 and the adjacent portion of the tubular extension 42 to provide a magnetic bridge primarily with the tubular extension 42 and secondarily with the coil 84. The sleeve 135 is close to the extension 42 but is spaced from the coil 84 sufficiently to permit the flow of substantial amounts of air therebetween.

The outer rim 123 and the sleeve 135 are bonded together by a material 147 somewhat similar to brake lining material but containing non-magnetic metal particles for improving the heat conductivity. Preferably, this material 147 contains about 36% to 39% asbestos fibers, 30% to 27% phenol formaldehyde resin and about 34% by weight of aluminum chips.

Instead of asbestos fibers there may be substituted glass or rock wool fibers.

Instead of phenol formaldehyde resin there may be substituted epoxy resin containing a hardener such as pyromellitic dianhydride and furfural alcohol.

Instead of aluminum chips, there may be used other non-magnetic metal chips such as copper or brass chips or powder. This material is non-magnetic and magnetically separates the ring-shaped rim 123 from the ring-shaped sleeve 135. It joins them so as to make a unitary pulley. It also serves to cool the double-row ball bearing 139. The heat from the discharge head 34 tends to flow through the tubular extension 42 to heat the ball bearing 139. Frequent clutching and declutching of the clutch also serves to heat the bearing 139. The material 147 containing the aluminum chips has sufficient heat conducting capacity, since it is of considerable width, to transmit a substantial portion of the heat to the rim 123 where the air has free access to it to dissipate the heat therefrom. Since this rim 123 is continuously rotated in the air, it has great heat dissipating capacity.

For the frictional surface 149 of the pulley 121, a material 151 of a different composition which includes scouring particles or powder is provided. Preferably, this is formed from about 3% of aluminum oxide powder, 53% to 56% asbestos fibers and 44% to 41% phenol formaldehyde resin. This material also holds and supports the annular interpole ring 153 spaced from and magnetically separated from the pulley rim 123 and the inner pulley sleeve 135. To extend the cleaning and scouring action of the material 151, the interpole ring 153 is provided with three circular or frusto-circular depressions or recesses 155 which are filled with this scouring resin. The ring 153 is also reduced in width at these depressions 155 by providing the reduced milled surfaces 157 on both sides of the depressions 155. The flange 133 is also provided with four transverse slots 159 which are also filled with the resin containing the scouring material. In addition, the end face of the sleeve 135 is provided with three transverse slots 161. Thus, all of the slots 159 and 161 as well as the depressions 155 and the areas in between the sleeve 135 and the ring 153 and the flange 133 are all filled with the material 151 containing the scouring powder, aluminum oxide. This material 151 in an irregular path extends continuously from the innermost edge to the outermost edge of the pole faces.

When the adjacent surface of the magnetic armature plate 70 engages the surfaces 149 of the pulley 121, there is some sliding of the surfaces relative to each other, causing the surface of the material 151 to wipe all the contacting surfaces of the armature plate 70 to keep it clean and free from contamination and glazing and galling. Both the materials 147 and 151 provide a strong bond with each other and with the inner sleeve 135, the interpole ring 153 and the outer rim 123. Both materials are wear resistant and heat resistant and the material 151 has a high coefficient of friction with the metal of the armature plate 70.

The energization of the armature coil 84 generates a flux which may be considered as flowing through the coil housing 88 inwardly through the inwardly extending flange 92 to and through the tubular extension 42 and crosses the small air gap to the inner portion 145 of the sleeve 135 from which it flows forwardly to the front pole face thereof and across to the inner ring 72 of the armature plate and through this ring and across the gap between the adjacent surfaces to the interpole ring 153 from which the magnetic circuit extends across the gap to and through the outer ring 74 of the armature plate and thence again across the gap to the circular flange 133 (forming the outer pole face) and thence through the rim 123 and the flange 131 to the flange 90 of the coil housing 88. The parts in this magnetic circuit are of such an arrangement that the maximum flux density is created at the pole faces of the pulley 121 and the armature plate 70 so as to provide a very high attractive force between them which pulls the armature plate 70 firmly into engagement with the surface 149 of the pulley 121 to provide a frictional driving engagement to cause the continuously rotating pulley to drive through the surface 149 to the armature plate 70 through the springs 66 and 78 and the hub 52 to the shaft 30.

The double-row ball bearing 139 and the tubular extension 42 carry all the force of the belt 125 so that the shaft 30 is relieved of this force and is sufficiently supported by the bearing 32 and a second bearing at its other end. The pulley 121 rotates continuously during the operation of the engine 129 so that the bearings 139 are never idle when the engine 129 is in operation. This prevents fretting or peening of the ball races of the bearing 139. The nut 60 and the threaded end of the shaft 30 are recessed within the outer face of the hub 52 so as to conserve space and especially to prevent any accidental contact therewith.

Figure 2:
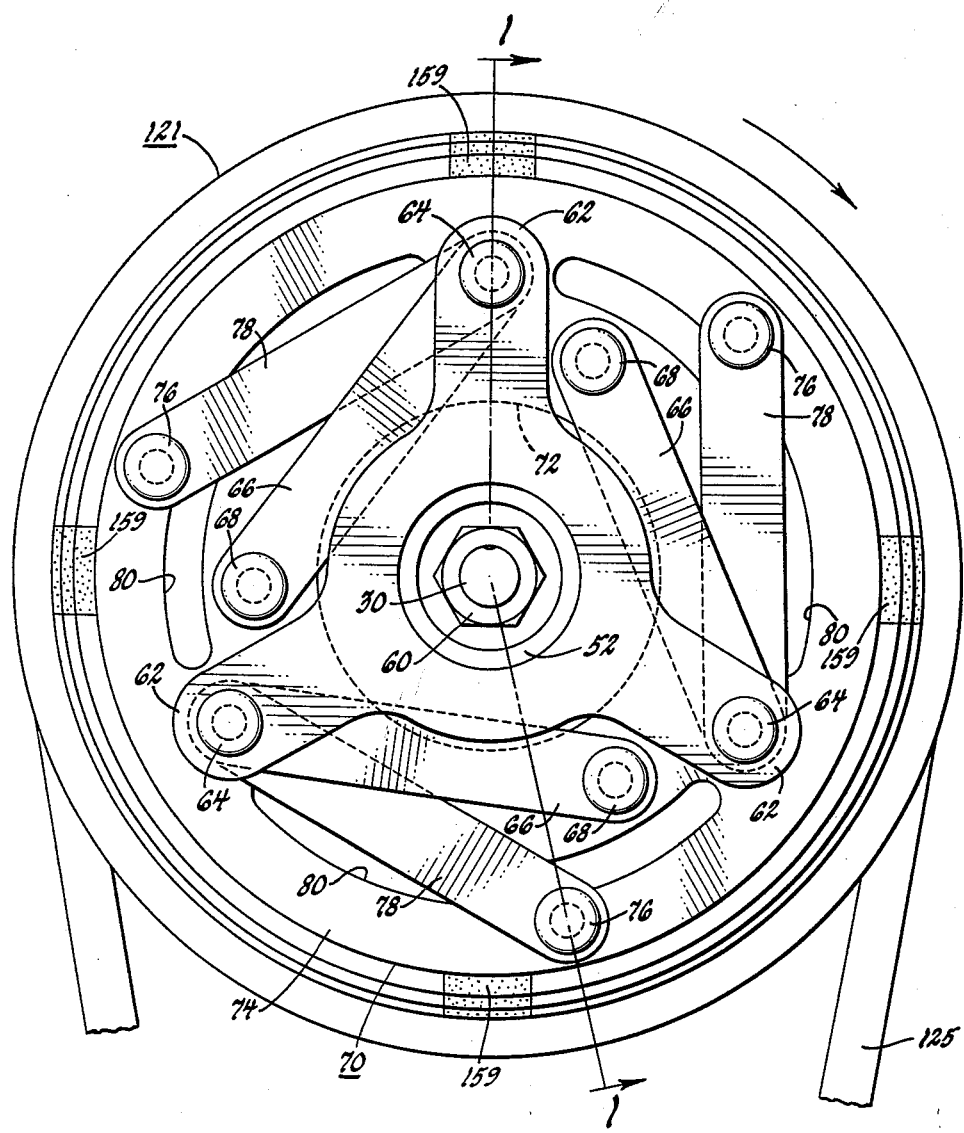
FIGURE 2 is a right-end view of the magnetic clutch shown in FIGURE 1.
Figure 3:
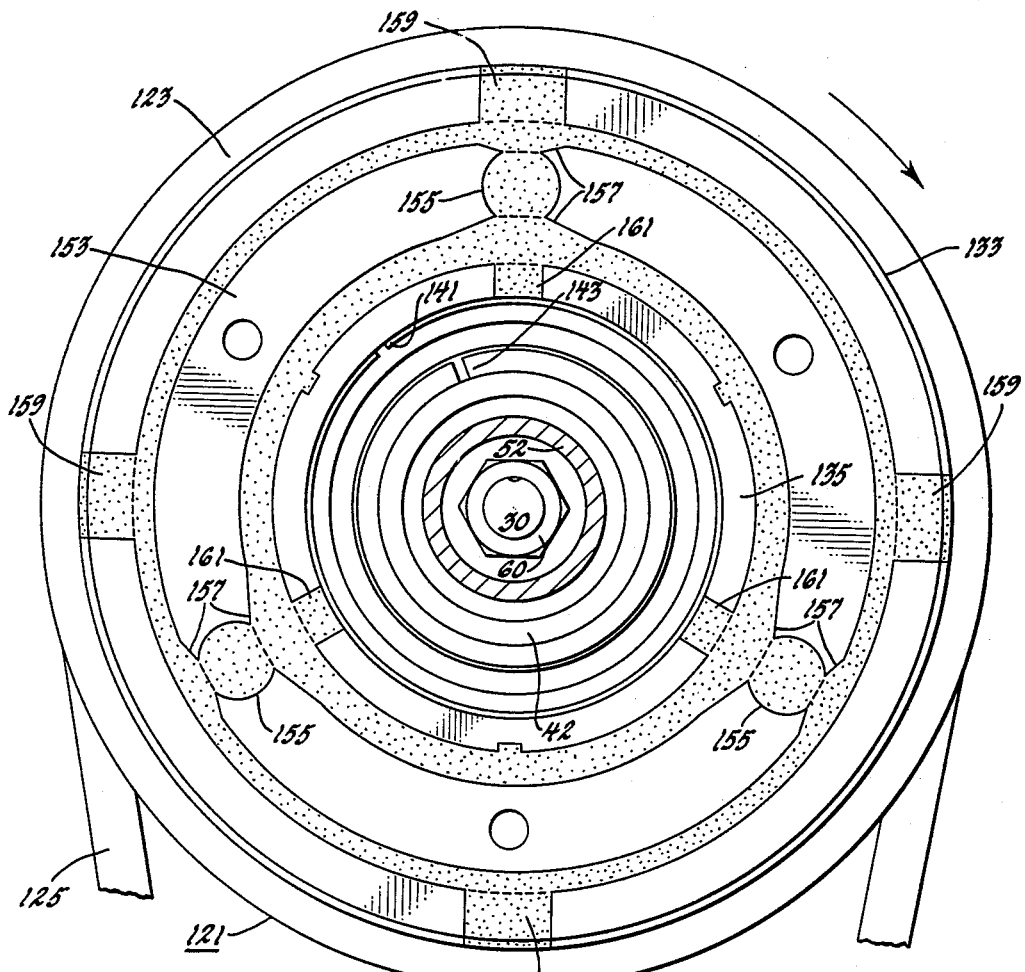
FIGURE 3 is a sectional view taken along the lines 3—3 of FIGURE 1.
Figure 4:
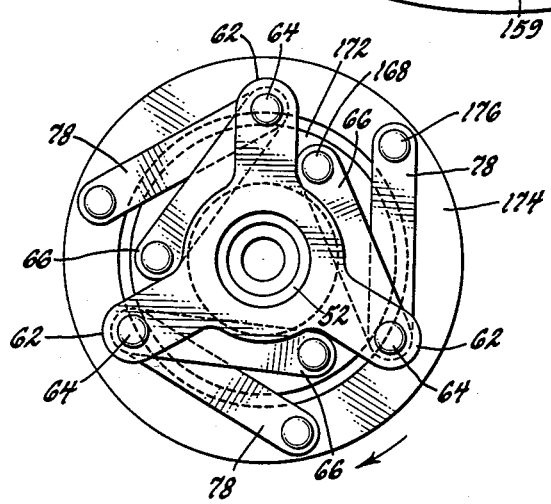
FIGURE 4 is an end view of a modified form of armature for the electromagnetic clutch shown in FIGURE 1.

In FIGURE 4, there is shown a modified form of armature in which the inner armature ring 172 and the outer armature ring 174 are magnetically as well as physically completely separate and consist of two concentric rings of paramagnetic material such as steel. The three-armed hub 52 is similarly connected to the shaft 30 and is a duplicate of the arrangement shown in FIGURES 1 and 2. The leaf springs 66 and 78 are similarly connected by the rivets 64 to the arms 62 of the hub 52. The leaf springs 66 and 78 extend in the direction opposite the direction of rotation as in FIGURE 2. However, the leaf springs 66 are connected by the rivets 176 to the inner ring 172 and the outer leaf springs 78 are connected by the rivets 176 to the outer ring 174. These springs 66 and 78 hold the contacting surfaces of the rings 172 and 174 in the same plane for improved contact with the surface 149 of the pulley 121. The complete separation of the rings 172 and 174 prevents and avoids any warping difficulties and provides better contact with the surface 149 of the pulley 121 under all conditions to provide a greater driving torque. The complete magnetic separation of the rings 172 and 174 prevents the slight leakage losses through the webs between the slots 80 in the armature plate 70. By both constructions and arrangements, I have provided a powerful electromagnetic clutch requiring only a small amount of current which has long life and high torque capacity.

While the embodiments of the present invention as herein disclosed, constitute a preferred form, it is to be understood that other forms might be adopted.

What is claimed is as follows:

1. In combination, a device provided with a first housing and a rotatable shaft protruding from the first housing, a sleeve of paramagnetic material rigid with and extending from said housing surrounding and concentric with said shaft, said sleeve being provided with a locking recess, a removable coil housing in the form of a ring of paramagnetic material seated on said sleeve against said first housing and a ring shaped coil lodged within and bonded to said coil housing, removable locking means having a portion lodged in said recess for locking axially said coil housing on said sleeve, interlocking means between said coil housing and said first housing to prevent rotation of said coil housing upon said sleeve, a driving element rotatable relative to said sleeve comprising a plurality of magnetically separated paramagnetic rings magnetically associated with said coil housing, and an armature connected to said shaft magnetically associated with said separated rings.

2. In combination, a device provided with a first housing and a rotatable shaft protruding from the first housing, a sleeve of paramagnetic material rigid with and extending from said housing surrounding and concentric with said shaft, a drive element rotatably mounted on said sleeve comprising an outer ring and an inner ring of paramagnetic material and a high heat conducting resin material containing non-magnetic metal particles extending between and magnetically separating and physically bonding together said inner and outer rings for transmitting heat from said sleeve and inner ring to said outer ring, an electromagnet coil fixed to said housing and magnetically associated with said rings, and an armature connected to said shaft magnetically associated with said drive element.

3. In combination, a device provided with a first housing and a rotatable shaft protruding from the first housing, a sleeve of paramagnetic material rigid with and extending from said housing surrounding and concentric with said shaft, a drive element rotatably mounted on said sleeve comprising an outer ring and an inner ring of paramagnetic material and a long wearing friction material containing resin and a fibrous non-inflammable material and also containing abrasive particles in and adjacent one of its surfaces and containing non-magnetic metal particles in other major portions thereof, said friction material extending between and magnetically separating and physically bonding together said inner and outer rings for transmitting heat from said sleeve and inner ring to said outer ring, an electromagnet coil fixed to said housing and magnetically associated with said rings, and an armature connected to said shaft magnetically associated with said drive element.

4. In combination, a rotatable driving element, a rotatable driven element, electromagnetic means associated with one of said elements including three concentric magnetic poles, armature means associated with the other element including two rings of paramagnetic material, said armature means also including a hub and separate springs extending from said hub to each of said rings.

5. In combination, a rotatable driving element, a rotatable driven element, electromagnetic means associated with one of said elements including three concentric magnetic poles, armature means associated with the other element including two rings of paramagnetic material, said armature means also including a hub and separate leaf springs extending from said hub to each of said rings in the general direction opposite the relative rotation of the electromagnetic means.

6. In combination, a device provided with a first housing and a rotatable shaft protruding from the first housing, a sleeve of paramagnetic material rigid with and extending from said housing surrounding and concentric with said shaft, a removable shaft seal within said sleeve surrounding said shaft in sealing engagement with said sleeve and shaft, the inside of said sleeve from the location of said seal to its outer end being larger than said shaft seal to permit the outward removal of said shaft seal, a rotatable driving element rotatably mounted upon said sleeve, electromagnetic means magnetically associated with said driving element, an armature magnetically associated with said driving element and electromagnetic means and being located at the end of said sleeve, said armature being provided with a hub extending within said sleeve and mounted on said shaft within said sleeve.

7. In combination, a device provided with a first housing and a rotatable shaft protruding from the first housing, a sleeve of paramagnetic material rigid with and extending from said housing surrounding and concentric with said shaft, a drive element rotatably mounted on said sleeve comprising an outer ring and an inner ring of paramagnetic material and a long wearing friction material containing resin and a fibrous non-inflammable material and also containing abrasive particles in and adjacent one of its surfaces, said friction material adjacent one surface also containing an intermediate ring of paramagnetic material magnetically separated from said inner and outer rings and having a plurality of frusto circular depressions in its surface, said friction material containing the abrasive particles extending between and magnetically separating and physically bonding together said inner and intermediate and outer rings and filling said frusto circular depressions in its surface, an electromagnet coil fixed to said housing and magnetically associated with said rings, and an armature connected to said shaft for magnetic and frictional association with said rings and said one surface of said friction material of said drive element.

8. In combination, a device provided with a first housing and a rotatable shaft protruding from the first housing, a sleeve of paramagnetic material rigid with and extending from said housing surrounding and concentric with said shaft, a removable coil housing in the form of a ring of paramagnetic material seated on said sleeve against said first housing and a ring shaped coil lodged within and bonded to said coil housing, locking means for locking axially said coil housing on said sleeve, interlocking means between said coil housing and said first housing to prevent rotation of said coil housing upon said sleeve, a driving element rotatable relative to said sleeve comprising a plurality of magnetically separated paramagnetic rings magnetically associated with said coil housing, and an armature connected to said shaft magnetically associated with said separated rings, said coil housing being provided with ventilating openings adjacent said sleeve, said coil housing being spaced from said first housing in between said interlocking means to provide for the access of external air to said ventilating openings, said coil being spaced at two surfaces thereof from adjacent parts to provide spaces for the circulation of air communicating with said ventilating openings.

9. A compressor including pumping means provided with a discharge head having extending therefrom an integral sleeve and a drive shaft extending through the sleeve, said sleeve being structurally integral with and constituting a single piece with said discharge head, a drive element rotatably mounted on said sleeve comprising an inner tubular portion and an outer ring of paramagnetic material and a high heat conducting resin material containing non magnetic metal particles extending between and magnetically separating and physically bonding together said inner tubular portion and the outer ring for transmitting heat from said sleeve and inner tubular portion to said outer ring, an electromagnet coil mounted on said sleeve and fixed to said discharge head and magnetically associated with said drive element, and an armature located at the outer end of said sleeve connected to said shaft and magnetically associated with said drive element.

References Cited in the file of this patent

UNITED STATES PATENTS

| | | |
|---|---|---|
| 2,457,880 | Edwards | Jan. 4, 1949 |
| 2,661,696 | Dale | Dec. 8, 1953 |
| 2,738,045 | Mergen et al. | Mar. 13, 1956 |
| 2,791,100 | Maurer | May 7, 1957 |
| 2,796,962 | Pierce | June 25, 1957 |
| 2,796,963 | Harter | June 25, 1957 |
| 2,914,156 | Harting | Nov. 24, 1959 |
| 2,919,777 | Walter | Jan. 5, 1960 |